United States Patent
Heinrich

(10) Patent No.: US 9,009,518 B2
(45) Date of Patent: Apr. 14, 2015

(54) METHOD AND APPARATUS FOR CONVEYING AND REPRODUCING MULTIPLE INDEPENDENT TIMEBASES USING A SHARED REFERENCE CLOCK, CLOCK SNAPSHOTS AND A PACKET NETWORK

(75) Inventor: Kenn W. Heinrich, Whitby (CA)

(73) Assignee: Cisco Technology, Inc., San Jose, CA (US)

( * ) Notice: Subject to any disclaimer, the term of this patent is extended or adjusted under 35 U.S.C. 154(b) by 586 days.

(21) Appl. No.: 13/193,090

(22) Filed: Jul. 28, 2011

(65) Prior Publication Data

US 2012/0025884 A1    Feb. 2, 2012

Related U.S. Application Data

(60) Provisional application No. 61/368,741, filed on Jul. 29, 2010.

(51) Int. Cl.
*G06F 1/12* (2006.01)
*H04N 21/242* (2011.01)
*H04N 21/43* (2011.01)
*H04J 3/06* (2006.01)

(52) U.S. Cl.
CPC .............. *H04N 21/242* (2013.01); *G06F 1/12* (2013.01); *H04N 21/4305* (2013.01); *H04J 3/0697* (2013.01); *H04J 3/0664* (2013.01)

(58) Field of Classification Search
CPC ......................................................... G06F 1/12
USPC .......................................................... 327/160
See application file for complete search history.

(56) References Cited

U.S. PATENT DOCUMENTS

| | | | |
|---|---|---|---|
| 6,191,821 B1 * | 2/2001 | Kupnicki | 348/512 |
| 2005/0169281 A1 * | 8/2005 | Ko et al. | 370/400 |
| 2007/0283390 A1 * | 12/2007 | Gordon et al. | 725/43 |
| 2010/0118895 A1 * | 5/2010 | Radulescu | 370/503 |

* cited by examiner

*Primary Examiner* — Jaweed A Abbaszadeh
*Assistant Examiner* — Austin Hicks
(74) *Attorney, Agent, or Firm* — Merchant & Gould

(57) ABSTRACT

Disclosed are methods and systems of conveying and reproducing independent timebases in a network. The methods include distributing a common measurement clock and a common measurement clock counter to a plurality of cards in a master chassis in the network. Distributed master clock counters are locked to an external input signal in each of the plurality of cards. Periodic snapshots of a count value generated by the master clock counter are taken. A counter speed of the master clock counter is analyzed to create a future snapshot of the count value. The future snapshot of the count value is transmitted from the master chassis to at least one receiving chassis in the network. The association between master counters and slave counters is programmable by various means including modifying the routing of the snapshot packets.

18 Claims, 4 Drawing Sheets

METHOD AND APPARATUS FOR CONVEYING AND REPRODUCING MULTIPLE INDEPENDENT TIMEBASES USING A SHARED REFERENCE CLOCK, CLOCK SNAPSHOTS AND A PACKET NETWORK

CROSS-REFERENCE TO RELATED APPLICATIONS

This utility application claims the benefit under 35 U.S.C. §119(e) of U.S. Provisional Patent Application No. 61/368,741 filed on Jul. 29, 2010, which is hereby incorporated by reference in its entirety.

BACKGROUND

In traditional television broadcasting, both analog and digital, it is important to manage timing and synchronization properly. Historically, in analog television, a timebase referred to the rate of a reference signal called video black burst. Synchronization was necessary to allow ease of editing and switching. With the advent of digital television, the concept of a timebase naturally extended to include the rate of a 27 Megahertz Moving Picture Experts Group ("MPEG") program clock and the value of an MPEG system clock. Timebase synchronization is necessary to prevent both digital buffer underflows and overflows, as well as to allow proper audio-video synchronization (e.g., lipsync) to be maintained.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Overview

Figure 1:
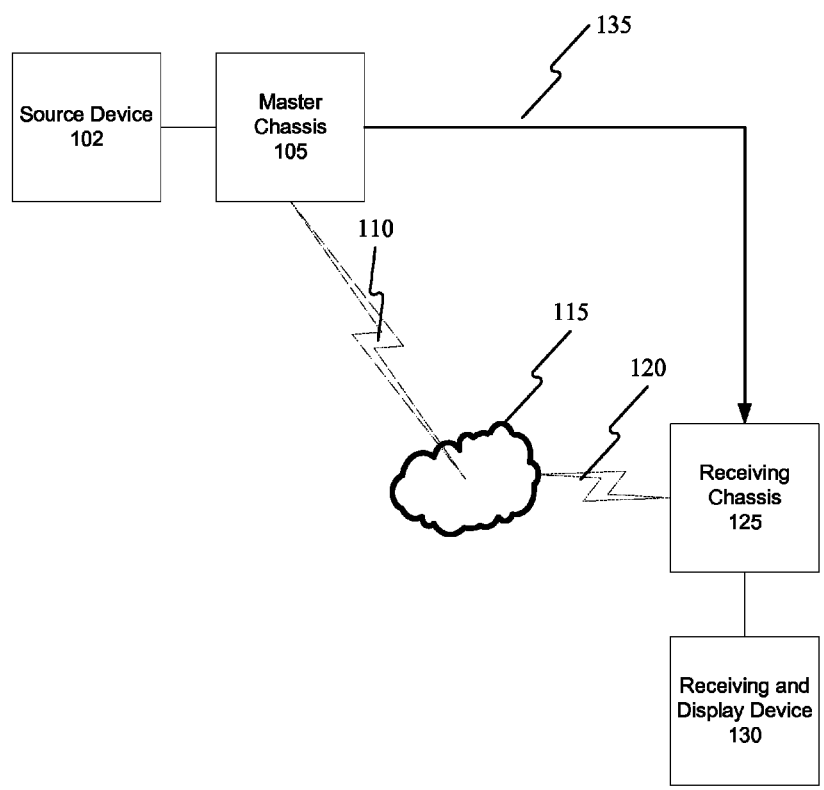
FIG. 1 shows an operating environment for a network for conveying and reproducing independent timebases.

In accordance with an embodiment, a method is disclosed for conveying and reproducing independent timebases in a network. The method may include: distributing a common measuring clock and a common measuring clock counter to a plurality of cards in a master chassis in the network, locking a master clock counter to an external input signal in each of the plurality of cards, taking periodic snapshots of a count value generated by the master clock counter, analyzing the counter speed of the master clock counter to create a future snapshot of the count value projected to a known instant of the common measuring clock and transmitting the future snapshot of the count value from the master chassis to at least one receiving chassis in the network.

Definitions

Definitions/Acronyms:
FPGA—Field Programmable gate Array.
NCO—Numerically Programmable Oscillator.
DDS—Direct Digital Synthesizer.
CMC—Chassis Master Clock or Common Measuring Clock.
TBX—Timebase Exchange.
MPEG—Moving Pictures Expert Group; refers to ISO/IEC 13818-1 and related international standards.
VCXO—Voltage Controlled Crystal Oscillator.
GPS—Global Positioning System.
PLL—Phase Locked Loop.
DPLL—Digital Phase Locked Loop.
PCR—MPEG Program Clock Reference.
SCR—MPEG System Clock Reference.
ppm—Parts Per Million.

Example Embodiments

Various embodiments are described more fully below with reference to the accompanying drawings, which form a part hereof, and which show specific embodiments of the disclosure. However, embodiments may be implemented in many different forms and should not be construed as limited to the embodiments set forth herein; rather, these embodiments are provided so that this disclosure will be thorough and complete, and will fully convey the scope of the disclosure to those skilled in the art. Accordingly, the following detailed description is, therefore, not to be taken in a limiting sense. In particular, this disclosure applies equally well to distributing a plurality of timebases between distinct chassis in a larger system or between distinct cards in a single chassis. Therefore, the terms chassis and card should be taken to mean either concept, as appropriate.

Embodiments of the disclosure may be thought of as having two layers. The first layer may allow for a single clock to go from one card to another card without needing a fixed clock wire to carry the clock rate directly. Instead, a generic data packet coupled with a common measuring clock may be used. The second layer is a generic data packet that can contain, for example, 32 slots, 1,000 slots or any number of slots. The slots may allow any number of channels of synchronized clocks across the same data packet instead of needing thousands of clock wires (i.e., one clock wire for each channel), using a regular data packet across a back plane, while still using only a single instance of the common measuring clock.

The first layer tries to keep rates and counters synchronized between two different ports in the chassis. For example, a video encoder board receives a signal and needs to transmit it to an audio board. The lowest layer approach is to, within the chassis, distribute one central measuring clock and one central measuring counter that all of the cards can see and use as a yardstick to measure the other clock rates against, and to measure the other clocks' counters against. This common measuring clock may be a free-running precision crystal oscillator within the chassis or may in turn be derived from an external time signal such as GPS.

A counter can count the pulses of the common measuring clock (e.g., a chassis master clock). At regular intervals, such as, for example, 1,000 tics or a million tics, a snapshot of the input counter can be taken. Each of these regular intervals is derived from the common counter value, and is called an epoch. The start of each epoch is therefore a reference point in time known by all cards in the system. By knowing the rate of the input signal, a precise estimate of the counter value at the start of the next epoch can be predicted and forwarded to another card. One data packet per epoch is transmitted. The downstream card can predict that at a reference time, its clock counter should be at X number of tics. From this point the downstream card can speed up or slow down its clock to match the reference clock.

Individual digital counters that are running on a first card and on a second card do not need to be clocked by a physical clock wire at the rate of the input signal, incrementing by one each clock cycle. Instead, they can be clocked using a general purpose clock wire (the common measurement clock) that comes in off the back plane and can increment by a variable amount each clock cycle to yield the same average rate of increase. Every now and then the first card and the second card might skip a count or they might double a count if the input signal's clock is faster or a little slower than what the back plane indicates. This is reflected by a counter number on the input card increasing faster or slower than it might otherwise. The second card sees the counter snapshot and knows the agreed upon reference time at which that snapshot was meaningful. The second card knows how closely its counter is tracking and can calculate a new counter rate to make its counter track with the master clock. This can be done by dividing the required count difference by the time remaining to the next reference point, in order to compute the required rate of a receiver counter increment. This calculation can also be augmented by other algorithms, such as smoothing filters. As a result, the only piece of information that needs to flow between the first card and the second card is a data packet with information that indicates, at a reference time, that a snapshot and a counter value can be used by the second card to determine how to track the master clock.

One way in which the embodiments discussed herein differ from conventional systems is that the system discussed herein knows in advance that the first card and the second card share a clock rate on the back plane. Therefore the two cards can be in close agreement of when they think the snapshot occurred and they can be in close agreement on how much they think they need to speed up or slow down in order to track the master clock. This enables the first and second cards to calculate much more precisely and much more accurately than a conventional system where a snapshot is sent to cards without a shared timing reference. In those conventional systems, any delivery time latency or jitter may cause timing errors at the receiver, along with second order error effects, due to local oscillator frequency offsets.

Another difference between the embodiments discussed herein and conventional systems is that the first card knows all the information about whether its clock is running faster or slower and allows the first card to adjust its clock to match the next snapshot. The first card can gradually change its rate and have advanced warning of how to predict the master clock's counter value.

The second layer allows snapshots from more than one timebase to be sent in the same data packet. Thus, from one data packet per epoch and one common measurement clock, a multiplicity of timebases may be conveyed. After using the data in the packet and performing the rate calculations for one slave counter, the remaining snapshots in the data packet data can be used to update the other slave counters. The same shared clock wire can be reused as well so that the two cards agree on what the reference time is. While this description of the system herein uses two cards, it should be appreciated that the system may be extended to cover a larger number of different timebases. In addition, the system uses a back plane packet instead of physically hard wiring one transmitter to one receiver (i.e., one card to another card). This allows for customary data manipulation and routing via software and routing techniques known in the art. Any receiver may therefore track any master simply by selecting the data packet or by selecting a particular snapshot within a data packet.

Using packets across the backplane, the system may support, for example, as many as 64,000 different timebases. It should be appreciated that in order to handle this many timebases using conventional technology, 64,000 wires would be required across the backplane. The aforementioned number of wires is unfeasible utilizing conventional technology.

Turning now to the figures, FIG. 1 shows an operating environment for a system 100 for conveying and reproducing independent timebases. The system 100 may contain a source device 102 which provides a timebase. Source device 102 may be a video camera, satellite receiver, video tape player, or other device. The system 100 may contain a master unit (i.e., a master chassis or card) 105 that may transmit multiple channels of audio and video on a communications link 110. Communications link 110 may be a wired connection or a wireless connection. Communications link 110 may connect master unit 105 to a network 115. The master unit 105 may comprise, for example, a digital video compression unit. The network 115 may comprise various types of networks such as satellite TV, Cable TV (CATV), closed circuit TV (CCTV), the Internet, the Public Switch Telephone Network ("PSTN"), etc. The network 115 may also comprise a backplane bus local to the system chassis.

The network 115 may connect to a receiving unit 125 via a communications link 120. Similar to the communications link 110, the communications link 120 may be a wired connection or a wireless connection. A shared clock reference clock signal 135 is directly connected between the master unit 105 and the receiving unit 125. In accordance with various embodiments, the shared clock reference clock signal 135 may comprise a direct wire or, alternatively, a GPS reference signal. The receiving unit (i.e., a chassis or card) 125 will be described in greater detail below with regard to FIGS. 2 and 3. In accordance with various embodiments, the receiving unit 125 may be, for example, a digital audio compression encoder. The receiving unit 125 may be connected to a receiving and display device 130. The receiving and display device 130 may comprise, for example, a television ("TV") and a computer monitor, or a TV and a cable television set-top box.

Figure 2:
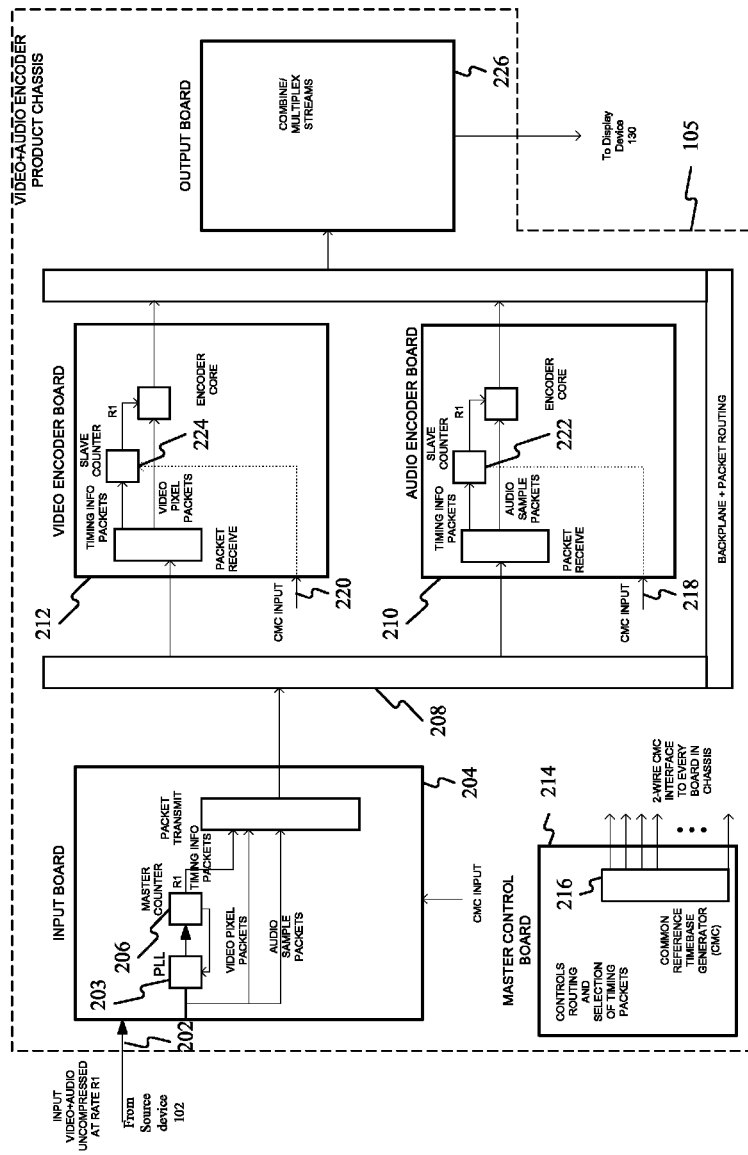
FIG. 2 shows a single channel configuration for conveying and reproducing independent timebases.

FIG. 2 shows a single channel configuration (i.e., a master unit 105) for conveying and reproducing independent timebases. The master unit 105 has an input 202 from source device 102. The input 202 feeds into an input board 204. The input board 204 may have a master counter 206. The input board 204 may receive both an audio and a video portion of a signal. The audio portion may be transmitted to a backplane 208 for transmission to an audio encoder board 210. The video portion may be transmitted to backplane 208 for transmission to a video encoder board 212.

The master unit 105 also has a master control board 214. The master control board 214 includes a common measuring clock generator 216. The common measuring clock generator 216 is connected to audio encoder board 210 and video encoder board 212. The master control board 214 transmits its timing signal directly to inputs 218 and 220. The master control board 214 also transmits the timing signal to the input board 204.

The master counter 206 is locked to the rate of the input signal 202 by phase locked loop 203. The value and rate of the master counter 206 are used to construct a data packet as described above and below with respect to FIG. 4 to drive an adjustment of slave counter 222 and slave counter 224 located on audio encoder board 210 and video encoder board 212, respectively.

The master unit 105 also contains an output board 226. The output board 226 may combine or multiplex the audio stream and the video stream to create synced audio/video data for transmission to the receiving unit 125. The syncing of the audio stream and the video stream may be controlled according to the clock rates that are synced according to the method described in FIG. 4.

Figure 3:
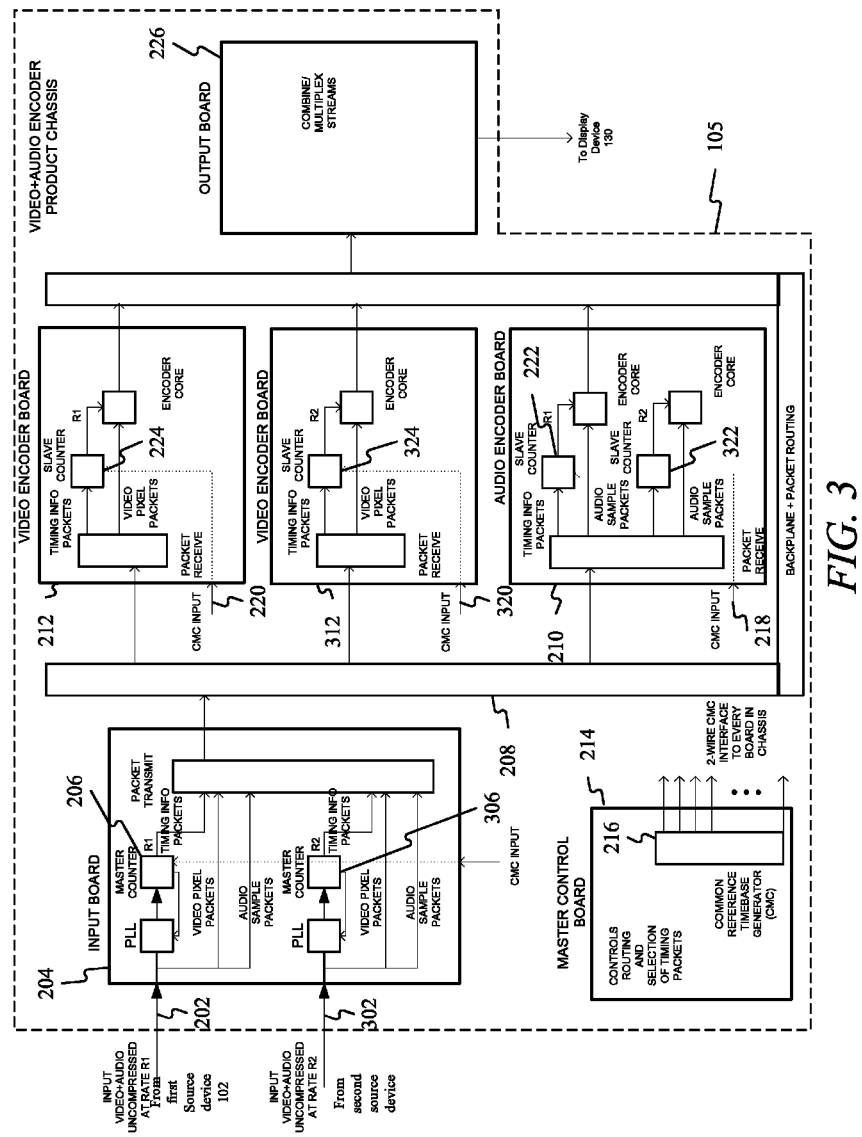
FIG. 3 shows a multichannel configuration for conveying and reproducing independent timebases.

FIG. 3 shows a multichannel configuration for conveying and reproducing independent timebases. The master unit 105 shown in FIG. 3 is basically the same as the master unit 105 shown in FIG. 2 except that the master unit 105 shown in FIG. 3 has a second video encoder board 312. Video input board 204 also contains a second master counter 306 which is locked to the input timebase on an input 302. The video input board 204 also contains a second input 302 connected to a second source device. Video encoder board 312 has a slave counter 324 and receives the common measuring clock from master control board 214 via input 320. In addition, audio encoder board 210 also includes a second slave counter 322. The synchronization of the slave counter 222, slave counter 224, slave counter 322 and slave counter 324 is described below with reference to FIG. 4. By appropriate routing of the data packets, and selecting one of the multiplicity of snapshots contained in the data packets, any of the slave counters 224, 324, 222, 322 can be locked to either of the master counters 206 and 216. While FIG. 3 shows two video and two audio channels one skilled in the art should appreciate that the master unit 105 may be configured to handle any number of video and audio channels. Additionally, while FIG. 3 shows two master counters and four slave counters one skilled in the art should appreciate that the master unit 105 may be configured to route any number of master counters to any number of slave counters in any association. Additionally, while FIG. 3 shows a topology which has masters and slaves sharing a common measuring clock on different cards within one chassis, embodiments of the disclosure are also applicable to masters and slaves sharing a common measuring clock in different chassis within a larger network.

While the systems of FIGS. 2 and 3 show master counters distributing timebases to slave counters within a single master unit 105, it will be apparent that the disclosure applies equally when slave counters in the receiving (i.e., slave) unit 125 receive future snapshots of master counters in the master unit 105 via the network 115 and the communications links 110 and 120. In this case, the common measuring clock 126 distributed within the master unit 105 would need to be the same as the common measuring clock distributed within receiving unit 125. This may be accomplished by locking the shared reference signal 135 to each of the common measuring clocks 126. Thus, the embodiments discussed herein are able to distribute timebases virtually between cards inside a single chassis as well as being able to distribute the same timebases between chassis in a larger system.

Figure 4:
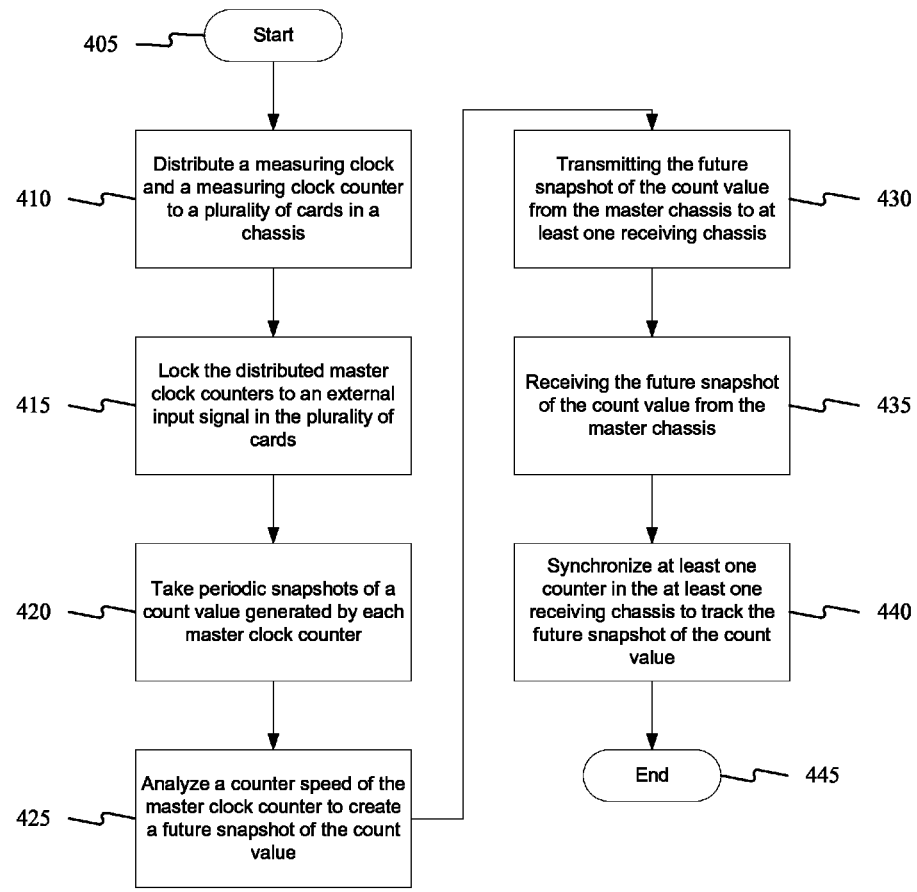
FIG. 4 shows a flowchart for a method for conveying and reproducing independent timebases in a network.

FIG. 4 shows a flowchart for a method 400 for conveying and reproducing independent timebases in the system 100. The method proceeds from starting block 405 to stage 410 where a common measuring clock and a common measuring clock counter may be transmitted to a plurality of cards in a master unit 105 in the network 115. The plurality of cards may be, for example, the audio encoder board 210, video encoder board 212 and video encoder board 312.

From stage 410, the method 400 may proceed to stage 415 where the distributed master clock counters may be locked to an external input signal in each of the plurality of cards. For example, the external input signal may be the external video input signal 202.

From stage 415, the method 400 may proceed to stage 420 where periodic snapshots of a count value generated by the master clock counter may be taken.

From stage 420, the method 400 may proceed to stage 425 where a counter speed of master clock counter 206 may be analyzed to create a future snapshot of the count value.

From stage 425, the method 400 may proceed to stage 430 where the future snapshot of the count value may be transmitted from the master chassis to at least one receiving unit 125 in the network 115. The transmitted future snapshot may be received at the receiving unit 125 at stage 435. Transmitting the future snapshot from the master unit 105 to at least one receiving unit 125 in the network 115 may comprise inserting the future snapshot into a packet and transmitting the packet to the at least one receiving unit 125 in network 115. Furthermore, transmitting the packet to the receiving unit 125 in network 115 may comprise transmitting a plurality of the packets to a plurality of receiving units 125 in the network 115 over multiple channels.

After receiving the further snapshot in stage 435, the method 400 may proceed to stage 440 where at least one counter in the at least one receiving unit 125 may be synchronized to track the future snapshot of the count value. Synchronizing the counter in the receiving chassis to track the future snapshot of the count value may comprise performing a calculation to match a count value generated by the at least one counter in the at least one receiving chassis to the count value generated by the master clock counter. In addition, synchronizing the counter in the receiving chassis to track the future snapshot of the count value may also comprise keeping a counter in the at least one receiving chassis counting to a same count value as the count value generated by the master clock counter in the master chassis. The method 400 may then terminate at termination block 445.

Reference may be made throughout this specification to "one embodiment," "an embodiment," "embodiments," "an aspect," or "aspects" meaning that a particular described feature, structure, or characteristic may be included in at least one embodiment of the present disclosure. Thus, usage of such phrases may refer to more than just one embodiment or aspect. In addition, the described features, structures, or characteristics may be combined in any suitable manner in one or more embodiments or aspects. Furthermore, reference to a single item may mean a single item or a plurality of items, just as reference to a plurality of items may mean a single item. Moreover, use of the term "and" when incorporated into a list is intended to imply that all the elements of the list, a single item of the list, or any combination of items in the list has been contemplated.

One skilled in the relevant art may recognize, however, that various embodiments may be practiced without one or more of the specific details, or with other methods, resources, materials, etc. In other instances, well known structures, resources, or operations have not been shown or described in detail merely to avoid obscuring aspects of the various embodiments described herein.

While example embodiments and applications of the present disclosure have been illustrated and described, it is to be understood that the disclosure is not limited to the precise configuration and resources described above. Various modifications, changes, and variations apparent to those skilled in the art may be made in the arrangement, operation, and details of the methods and systems of the present disclosure disclosed herein without departing from the scope of the claimed disclosure.

The above specification, examples and data provide a description of the manufacture and use of the disclosure.

Since many embodiments of the disclosure can be made without departing from the spirit and scope of the disclosure, the disclosure resides in the claims hereinafter appended.

What is claimed is:

1. A method comprising:
distributing a common measuring clock and a common measuring clock counter to a plurality of cards in a master chassis in a network;
locking distributed clock counters to an external input signal in each of the plurality of cards;
taking periodic snapshots of a count value generated by the common measuring clock counter;
utilizing the common measuring clock counter to define a sequence of reference instants in time;
analyzing a counter speed of the common measuring clock counter to create a future snapshot of the count value at a future reference instant;
transmitting the future snapshot of the count value from the master chassis to at least two receiving chassis in the network;
receiving, at the at least two receiving chassis, the future snapshot of the count value from the master chassis; and
synchronizing a counter in each of the at least two receiving chassis to track the future snapshot of the count value, wherein synchronizing the counter in each of the at least two receiving chassis further comprises synchronizing the counter of a first one of the at least two receiving chassis with the counter of a second one of the at least two receiving chassis, wherein synchronizing the counter of the first one of the at least two receiving chassis with the counter of the second one of the at least two receiving chassis comprises:
receiving a snapshot and a counter value of the counter from the second one of the at least two receiving chassis, and
determining a new count rate for the counter on the first one of the at least two receiving chassis based on the snapshot and the counter value of the counter received from the second one of the at least two receiving chassis, and wherein determining the new count rate comprises dividing a count difference by time remaining to a next reference instants in time.

2. The method of claim 1, wherein synchronizing the counter in each of the at least two receiving chassis to track the future snapshot of the count value comprises performing a calculation to match a count value generated by the counter in the at least two receiving chassis to the count value generated by the common measuring clock counter at the future reference instant.

3. The method of claim 1, wherein synchronizing the counter in each of the at least two receiving chassis to track the future snapshot of the count value comprises keeping the counter in each of the at least two receiving chassis counting to a same count value as the count value generated by the common measuring clock counter in the master chassis.

4. The method of claim 1, further comprising multiplexing an audio stream and a video stream utilizing the synchronized at least one counter.

5. The method of claim 1, wherein transmitting the future snapshot from the master chassis to the at least two receiving chassis in the network comprises:
inserting the future snapshot into a packet; and
transmitting the packet to the at least two receiving chassis in the network.

6. The method of claim 5, wherein transmitting the packet to the at least two receiving chassis in the network comprises transmitting a plurality of the packets to a plurality of receiving chassis in the network over multiple channels.

7. An apparatus comprising:
a master chassis comprising a plurality of communication cards, the master chassis operative to:
distribute a common measuring clock and a common measuring clock counter to the plurality of communication cards;
lock the common measuring clock counter to an external input signal in each of the plurality of communication cards;
take periodic snapshots of a count value generated by the common measuring clock counter;
analyze a counter speed of the common measuring clock counter to create a future snapshot of the count value; and
transmit the future snapshot of the count value; and
at least two receiving chassis in communication with the master chassis, each of the at least two receiving chassis operative to:
receive the future snapshot of the count value from the master chassis; and
synchronize a counter in each of the at least two receiving chassis to track the future snapshot of the count value, wherein synchronizing the counter further comprises synchronizing the counter of a first one of the at least two chassis with the counter of a second one of the at least two chassis, wherein synchronizing the counter of the first one of the at least two chassis with the counter of the second one of the at least two chassis comprises:
receiving a snapshot and a counter value of the counter from the second one of the at least two chassis, and
determining a new count rate for the counter on the first one of the at least two receiving chassis based on the snapshot and the counter value of the counter received from the second one of the at least two chassis, and wherein determining the new count rate comprises dividing a count difference by time remaining to a next reference instants in time.

8. The apparatus of claim 7, wherein the master chassis operative to transmit the future snapshot of the count value comprises the master chassis operative to insert the future snapshot into a packet.

9. The apparatus of claim 8, wherein the master chassis operative to transmit the future snapshot of the count value comprises the master chassis operative to transmit the packet.

10. The apparatus of claim 7, wherein each of the at least two receiving chassis operative to synchronize the counter in each of the at least two receiving chassis to track the future snapshot of the count value comprises each of the at least two receiving chassis being operative to perform a calculation to match a count value generated by the common measuring clock counter.

11. The apparatus of claim 7, wherein each of the at least two receiving chassis operative to synchronize the counter in each of the at least two receiving chassis to track the future snapshot of the count value comprises each of the at least two receiving chassis being operative to keep the counter in each of the at least two receiving chassis counting to a same count value as a count value generated by the common measuring clock counter in the master chassis.

12. The apparatus of claim 7, wherein one the at least two receiving chassis further comprises a multiplexer operative to combine an audio stream with a video stream utilizing the synchronized counter.

13. The apparatus of claim 7, wherein an association of slave counters to the common measuring clock counter is modified by modifying the routing of the snapshot data.

14. The apparatus of claim 7, further comprising a plurality of common measuring clock counters configured to distribute future snapshots to each of a plurality of slave counters, wherein each of the plurality of slave counters is configured to examine only the snapshots from a specific common measuring clock counter.

15. The apparatus of claim 14, wherein an association of the plurality of slave counters to the plurality of common measuring clock counters is configured to be modified by modifying instructions to the plurality of slave counters, wherein the association of the plurality of slave counters to the plurality of common measuring clock counters may be modified by modifying a combination of the routing of the snapshot data and the instructions to the plurality of slave counters.

16. The apparatus of claim 7 further comprising:
a video encoder card having a video slave counter; and
a audio slave counter on an audio encoder card, wherein an input board is in electrical communication with the video encoder card, wherein a master control board is operative to distribute the common measuring clock and a common measuring clock counter to the video slave counter and the audio slave counter via a backplane and wherein the video encoder card is operative to receive the future snapshot of the count value from the master control board.

17. The apparatus of claim 7 further comprising:
a video encoder card in electrical communication with an input board and having a video slave counter; and
a audio slave counter on an audio encoder card, wherein a master control board is configured to distribute the common measuring clock and a common measuring clock counter to the video slave counter and the audio slave counter via the backplane and wherein the video encoder card is configured to receive the future snapshot of the count value from the master control board.

18. An apparatus comprising:
a plurality of chassis, wherein each chassis is in electrical communication with each of the plurality of chassis; and
a plurality of cards within each of the plurality of chassis, wherein each card in a particular chassis of the plurality of chassis is in electrical communication with each of the plurality of cards within the particular chassis, wherein a first card of the plurality of cards in the particular chassis comprises a master counter and a second card of the plurality of cards comprises a slave counter;
wherein a network for distributes a common measuring clock and a common measuring clock counter to each chassis of the plurality of chassis and each of the plurality of cards within each of the plurality of chassis, wherein each card of the plurality of cards within each of the plurality of chassis is operative to distribute a master clock snapshot to the plurality of cards within each of the plurality of chassis, wherein each card of the plurality of cards within each of the plurality of chassis is operative to receive a future snapshot of a count value from a master control board, wherein each card of the plurality of cards is operative to synchronize at least one counter to track the future snapshot of the count value, wherein a first one of the plurality of chassis is operative to:
receive a snapshot and a counter value of the slave counter from a second one of the plurality of chassis, and
determine a new count rate for the slave counter of the first one of the plurality of the chassis based on the snapshot and the counter value of the slave counter received from the second one of the plurality of chassis, and wherein determining the new count rate comprises dividing a count difference by time remaining to a next reference instants in time.

* * * * *